United States Patent
Franz et al.

[19]

[11] Patent Number: 6,079,435
[45] Date of Patent: Jun. 27, 2000

[54] CURRENT TO PRESSURE CONVERTER

[75] Inventors: Hartmut Franz, Korb; Rolf Siebart, Ditzingen, both of Germany; Richard W. Kalinoski, Little Compton, R.I.

[73] Assignee: Foxboro Eckardt GmbH, Germany

[21] Appl. No.: 09/206,417

[22] Filed: Jul. 28, 1998

Related U.S. Application Data

[63] Continuation of application No. 08/748,821, Nov. 14, 1996, abandoned.

[51] Int. Cl.[7] .......................... F15B 13/044; G05B 11/48
[52] U.S. Cl. .................. 137/82; 251/129.08; 251/129.16; 251/129.17; 251/129.18
[58] Field of Search .......................... 137/82; 251/129.08, 251/129.16, 129.17, 129.18

[56] References Cited

U.S. PATENT DOCUMENTS

| | | | |
|---|---|---|---|
| 3,645,293 | 2/1972 | Pedersen . | |
| 4,540,453 | 9/1985 | Bordelon et al. | 335/297 X |
| 4,579,137 | 4/1986 | Brandt, Jr. | 137/82 X |
| 4,610,428 | 9/1986 | Fox | 251/129.16 |
| 4,767,097 | 8/1988 | Everett et al. | 251/129.18 X |
| 4,835,503 | 5/1989 | Everett | 335/229 |
| 4,875,499 | 10/1989 | Fox | 251/129.16 X |
| 4,954,799 | 9/1990 | Kumar | 335/258 X |
| 4,967,781 | 11/1990 | Baron | 137/82 |
| 5,065,979 | 11/1991 | Detweiler et al. | 251/129.18 X |
| 5,202,658 | 4/1993 | Everett et al. | 335/258 X |
| 5,424,704 | 6/1995 | Dolle | 251/129.18 X |
| 5,474,100 | 12/1995 | Nishijima et al. | 137/82 |

FOREIGN PATENT DOCUMENTS

| | | |
|---|---|---|
| 0653567 | 5/1995 | European Pat. Off. . |
| 0653567 A1 | 5/1995 | European Pat. Off. . |
| 2 137 319 | 10/1984 | United Kingdom . |
| WO 93/22715 | 11/1993 | WIPO . |

OTHER PUBLICATIONS

English Abstract of Japanese Publication No. 7–62483, Published Mar. 7, 1995.

*Primary Examiner*—Gerald A. Michalsky
*Attorney, Agent, or Firm*—Fish & Richardson P.C.

[57] ABSTRACT

An electropneumatic motor includes an electrically energizable magnetic circuit with an armature resiliently suspended in the air gap defined between two opposed pole pieces of differing dimensions. One of pole pieces includes an axially adjustable member of magnetic material. A fluid nozzle is carried by the other pole piece. Axial adjustment of the pole piece member affects the strength of the magnetic field. In one embodiment, the pole piece member includes a permanent magnet, which is axially movable relative to the armature, centered in the face of the pole piece. The combination of the fixed field from the permanent magnet and the electromagnetically induced variable field helps more nearly linearize the current to armature force relationship and increases the force on the armature. To determine the operating point of the motor, the suspension for the armature can be prestressed to force it as close as possible to the nozzle, and the magnet can be advanced until the armature is pulled off of the nozzle.

15 Claims, 4 Drawing Sheets

CURRENT TO PRESSURE CONVERTER

CROSS REFERENCE TO RELATED APPLICATION

This application is a continuation of Ser. No. 08/748,821, filed Nov. 14, 1996 and now abandoned.

BACKGROUND OF THE INVENTION

This invention relates generally to instruments for converting electrical current levels to fluid pressure.

In process control systems, it is often necessary to convert an electrical signal into a pressure signal. One well-known application of this technology is in a current to pressure transducer used, for example, in actuating an adjustable mechanical valve for flow control. A common form of electrical signal to pressure converter or transducer is the DC current amplitude (I) to pneumatic pressure (P) converter known in the process instrumentation art as an I/P motor, often coupled with a pressure booster, feedback control and positioner, in which case the combination is referred to as an electropneumatic positioner. In known I/P motors for such positioners, an armature of magnetizable material is suspended in a magnetic circuit closely spaced from a nozzle through which a pressurized pneumatic line is controllably vented. The armature and nozzle together form a flapper type pneumatic valve. The magnetic circuit includes an electromagnetic coil assembly which produces a variable magnetic field corresponding to the amplitude of an electrical current (i.e., the electrical input signal) applied to the coil. With a given current input level, the gap between armature and nozzle remains relatively constant, as the combination of the net magnetic force acting on the armature together with any resilience in its suspension just balances the force of the nozzle blast on the armature. However, in response to a change in the magnetic field experienced by the armature, the armature will move either closer to or farther away from the nozzle, blocking the nozzle blast either more or less, thus increasing or decreasing the pressure in the line as a function of the DC electrical current level.

SUMMARY OF THE INVENTION

In general, in one aspect of the invention, an electropneumatic motor, e.g., a current to pressure converter, includes an electrically energizable magnetic circuit with an armature resiliently suspended in the air gap defined between two opposed pole pieces one of which includes an axially adjustable member of magnetic material. A fluid nozzle is carried by one of the pole pieces.

In one embodiment, the axial adjustment of the pole piece member affects the strength of the magnetic field induced by an electric current. The adjustable pole piece member may include ea magnetizable portion of the core which is axially movable relative to the core.

In one general design approach, the armature is in the form of a slug of soft magnetically permeable material centered on a flat spring in the form of a diaphgram. The periphery of the diaphragm is captured between upper and lower mating cylindrical housings of magnetic material, each having an end portion supporting opposing pole pieces, one associated with the coil and the other supporting the nozzle. In one embodiment, the housing is made of chromenickel alloy, made, for example, through metal injection molding, with the armature made of Hastelloy B.

In another embodiment, the pole piece members are fixed. One pole piece member includes a permanent magnet, which is axially movable relative to the armature. In one design the permanent magnet is a solid element, e.g., a strong rare earth magnet in a disk shape, centered in the face of the pole piece surrounded by an electrical coil assembly.

In another aspect of the invention, an axially moveable permanent magnet on the face of the coil pole piece is used to adjust the operating point of the I/P converter. The armature is spring biased or prestressed so that the nozzle would be closed if the permanent magnetic were not applied. The permanent magnet is advanced toward the armature until it pulls the armature away from the nozzle. This adjustment allows the I/P converter's operating characteristics to be calibrated.

The use of an adjustable coil core member permits the force characteristic to be adjusted independently of the current in a practical manner for calibration of the instrument. In the embodiment with the permanent magnet, the flapper nozzle distance can be adjusted by moving the, permanent magnet axially until the correct operating point is adjusted. In addition, the relationship between current and force can be improved by use of a stationary or adjustable permanent magnet at the pole face. At low currents the force on the armature without a permanent magnet is low. When using the permanent magnet of the present invention, the static field of the permanent magnet results in greater force being available to move the armature at low current levels, thus permitting a reduction in the size and weight of the I/P motor. Using a permanent magnet in the end of the pole piece facing the armature also more nearly linearizes the relationship between low current levels and the resultant force acting on the armature, and, in the disclosed implementation, makes the resulting force dependent on the current direction.

DESCRIPTION OF THE PREFERRED EMBODIMENTS

Figure 1:
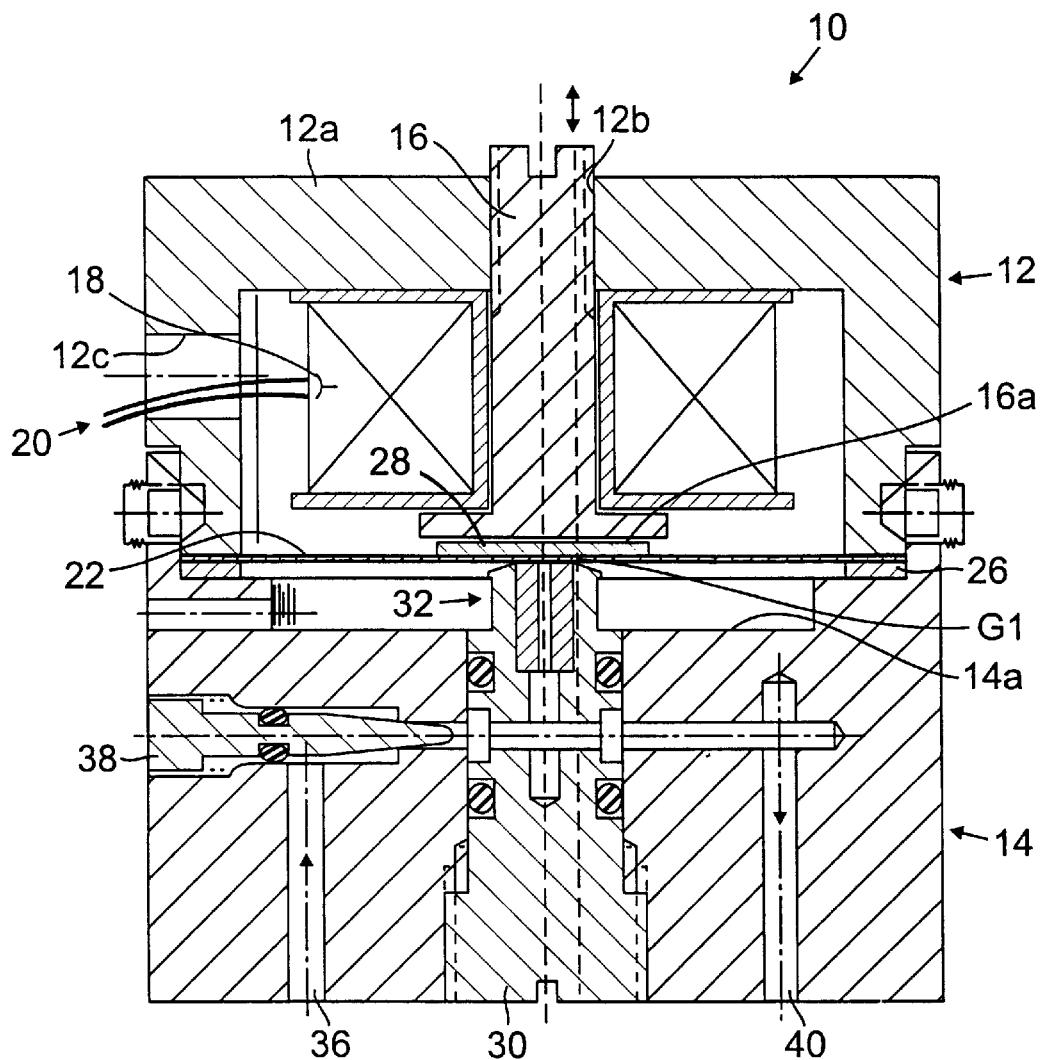
FIG. 1 is a longitudinal sectional view of an I/P converter motor having an adjustable pole member according to the invention.

As shown in FIG. 1, an I/P motor includes a generally cylindrical cover or housing 10 with integral closed ends made of magnetic material, e.g., low carbon 1010–1020 steel. The housing consists of two mating components, a cup-shaped upper portion 12 and a lower cylindrical portion 14 with a shallow circular recess 14a. The top 12a of the upper portion of the housing 12 has a coaxial threaded bore 12b which receives the threaded end of a bolt-like upper pole piece 16 of the same material. The lower end of the pole piece 16 terminates in an enlarged coaxial disc shaped end or pole face 16a, as shown in the FIG. 1. Mounted over the shank of the pole piece 16 is a coil assembly 18 consisting of, e.g., 8000 turns of 39 gauge magnet wire on a nylon bobbin, as shown, with a two zener diodes across the coil leads (not shown). The bobbin is bonded to the underside of the top of the housing 12a and is not connected directly to the pole piece 16. Wires 20 extend out through an opening 12c in the side wall of the upper housing 12a to carry current to the coil from an external source (not shown). Current signal levels are typically in the range 0 to 4 mA.

Figure 2:
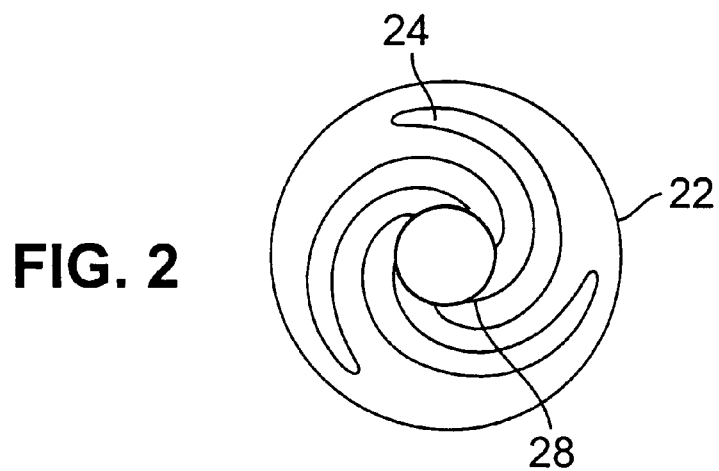
FIG. 2 is a plan view of the spring and flapper assembly for the I/P motor of FIG. 1.

The lower portion of the housing 14 is mated to the upper housing 12 in an interlocking joint with set screws as shown which clamps the periphery of a nominally flat, diaphragm-like spring 22, for example, etched with three spiral arms 24, as shown in FIG. 2, and made of nonmagnetic 300 series stainless steel. An optional spacer ring 26 between the housing halves clamps the spring firmly in position just below the pole face 16a. The spring has a thickness of, e.g., 0.0075 inch. Attached to the center of the upper surface of the spring 22 is a magnetically permeable armature 28 in the form of a disc-shaped slug. The armature 28 can be made of the same steel as the housing and have thickness of about 0.0185 inch with a diameter slightly less than that of the pole face. Thus, the armature sits just below the pole face resiliently suspended by the flat spring 22.

Figure 3:
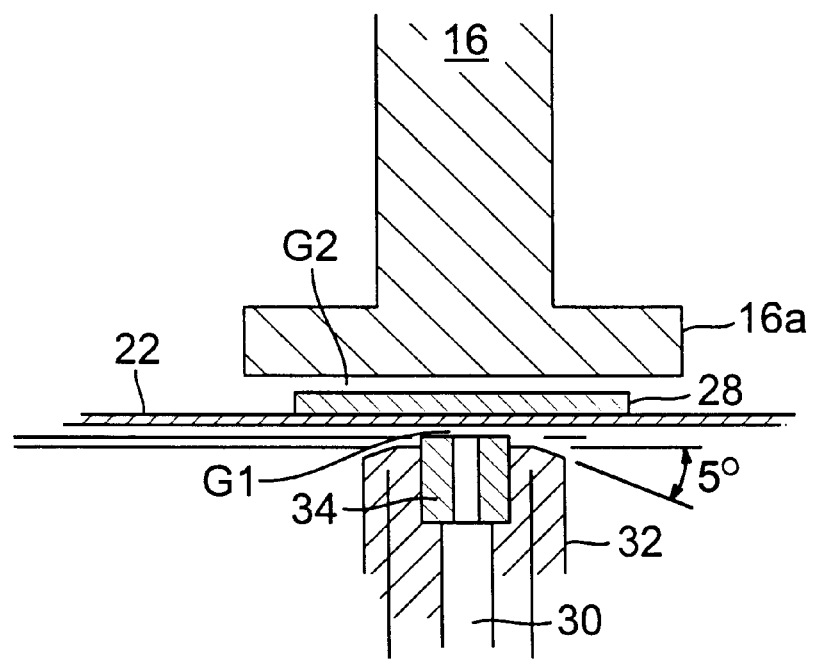
FIG. 3 is a detail sectional view of the nozzle flapper gap area of the motor of FIG. 1.

The lower housing 14 is part of the magnetic circuit for the electromagnetic coil and also includes a pole piece 30 carrying an integral nozzle 32 at its upper end with coaxial nozzle insert 34 (FIG. 3) of nonmagnetic 300 series stainless steel. The nozzle insert sticks up above the end of the nozzle 32 slightly as shown in FIG. 3 (e.g., 0.0005"). The body of the lower housing 14 and nozzle pole piece 30 are channeled as shown in FIG. 1 for delivery of pressurized air to the nozzle from the supply inlet 36 via an adjustable restrictor 38 in the form of a threaded needle valve. The output from the I/P motor is taken from air outlet 40 which communicates with the channel supplying the nozzle. Thus, in passing from the inlet to the outlet some of the air pressure can be bled off by the nozzle. The nozzle pole piece 30 is threadably received in the housing 14 so that the position of the nozzle above the floor of the recess 14a can be adjusted. Suitable O-rings on movable elements in the pneumatic line, i.e., the pole piece 30 and restrictor 38, seal the air passages as shown.

The pressure in the output line is a function of the gap G1 between the nozzle insert 34 and the armature 28 as shown in FIG. 3. The bigger the gap the more air escapes through the nozzle and the lower the pressure at the outlet 40, and vice versa. The gap G1 also determines the force of the nozzle blast against the armature 28.

Because upper pole face 16a has larger dimensions than the lower pole face of pole piece 30 and the lower pole face includes the projecting nozzle of non-magnetic material, the reluctance decreases in the direction of the lower pole 30 and creates an inhomogenous field. Increasing flux density in the air gap between the nozzle 32 and pole face 16a by increasing the current input to the coil 18 causes the armature to experience a magnetic force tending to pull armature 28 toward the nozzle, thus permitting the armature to block or choke the nozzle to a greater degree which increases the pressure between the nozzle and restrictor 38, which is in turn communicated directly to the outlet 40. Both lower gap G1 and upper gap G2 between the armature and the pole face 16a determine the total reluctance of the air gap between the nozzle and the pole face and thus the flux gradient experienced by the armature. In order to minimize the total reluctance and maximize the flux density, the gaps G1 and G2 should be made as small as possible for improved gain. A typical gap size for G1 at zero current is 0.005 inch and for G2 is 0.001 inch.

Figure 4:
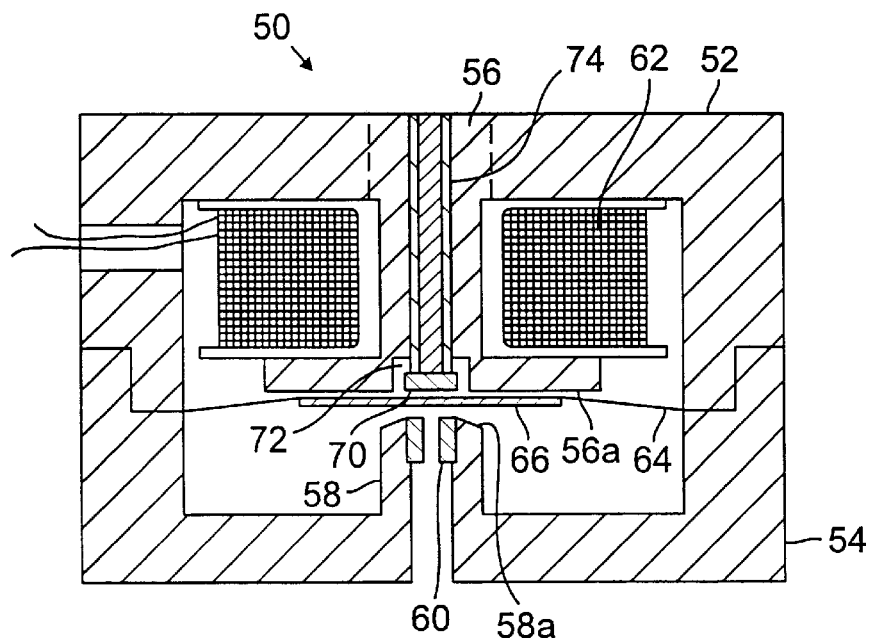
FIG. 4 is a longitudinal sectional view in diagrammatic form of an I/P converter motor with a movable permanent magnet in the face of the pole piece according to another aspect of the invention.

An improvement on the I/P motor design of FIG. 1 is shown in FIG. 4. Like the embodiment of FIG. 1, the I/P motor 50 of FIG. 4 comprises upper and lower cylindrical mating housing halves 52 and 54 made of the same magnetic material and opposed pole pieces 56 and 58. The housing part has a fixed upper pole piece 56 with a depending pole face 56a spaced from the smaller lower pole face 58a and nozzle insert 60. Upper pole face 56a is larger in area than lower pole face 58a. A bobbin wound coil 62 surrounds the upper pole piece 56 as shown. A flat spring 64 clamped between the housing halves carrying a disc-shaped armature 66 of magnetic material is suspended in the gap between and parallel to the opposed upper and lower pole faces 56a and 58a. In the case of FIG. 4, the armature, is mounted beneath the flat spring unlike FIG. 1. The nozzle air flow defined by the nozzle flapper gap creates a pressure difference which controls a pneumatic constant flow preamplifier in the way that the output pressure is independent of the supply pressure. The pneumatic line inlet, restrictor and outlet communicating with the nozzle 60 are not shown in FIG. 4.

In addition to the basic elements of the embodiment of FIG. 1, the I/P motor 50 of FIG. 4 includes a small permanent magnet 70, preferably a rare earth magnet, situated in an opening 72 in the center of the upper pole face 56a on the end of a rod 74 of nonmagnetic material, which can be pressed or threaded in the upper pole piece 56 as shown in FIG. 4. The magnet 70 may be advanced toward or away from the armature 66 by means of the axially positionable rod.

Figure 5:
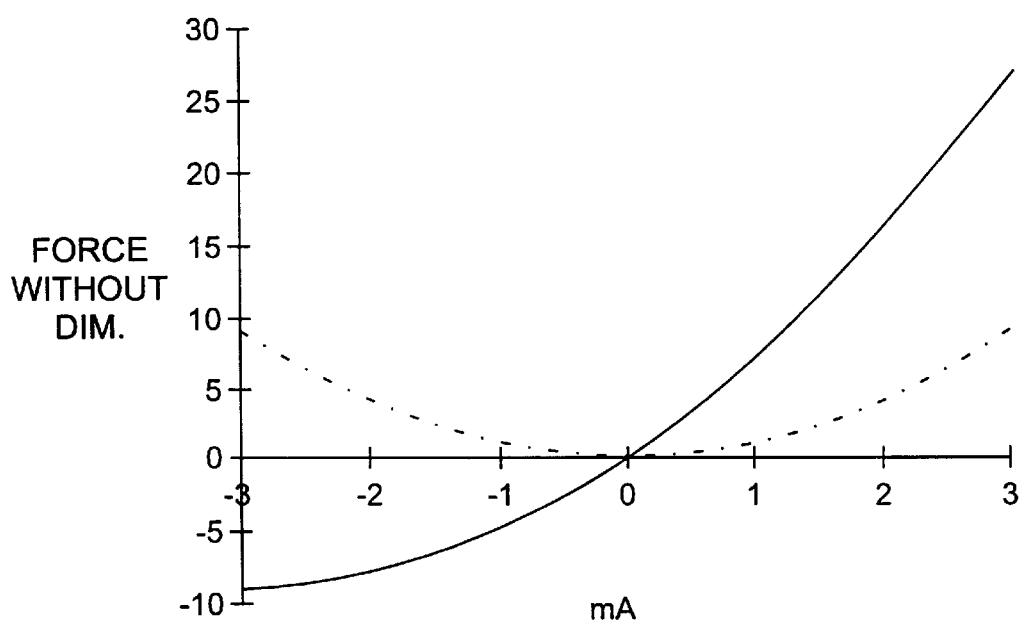
FIG. 5 is a graph of force acting on the armature (arbitrary dimensions) created by an applied current in milliamperes comparing the systems using (continuous line) and not using (dotted line) a permanent magnet.

One of the attributes of the design of FIG. 1 is that it requires extremely tight tolerances to get the correct operating point of the flapper nozzle system. In addition, at low currents there is very low resulting force on the armature due to the quadratic characteristic. As shown in FIG. 5, the dotted line represents the relationship between current and force on the armature 66. As the current approaches zero the relative change in force diminishes dramatically. In addition, as the current passes through zero and becomes more negative, the force starts back up in the positive direction because of the quadratic characteristic. In the improved embodiment of FIG. 4, the permanent magnet integrated into the pole piece generates an additional magnetic field partly acting (1) between the magnet 70 and the surrounding soft iron of the upper pole piece 56 as well as partly through (2) the air gap between the upper and lower pole faces 56a and 58a. Because of the addition of the constant strength static field contributed by the permanent magnet in the pole face air gap, the resulting net magnetically produced force on the armature is chiefly due to the product of the two magnetic fields, one permanent, the other generated by the electrical current. The characteristic relationship between current and force on the armature becomes decidedly more linear, the force level is very much increased, especially at very low current levels and the force direction becomes dependent on the current direction, as shown in FIG. 5, in contrast to the dotted curve representing the current/force relationship without the permanent magnet.

Without the permanent magnet, the force is given by:

$$F \approx \Phi_e^2$$

with $\Phi_e$ the magnetic flux generated by the current.

$$\Phi_e \approx nI$$

With the permanent magnet added:

$$F \approx (\Phi_s + \Phi_e)^2 \approx \Phi_s^2 + 2\Phi_s\Phi_e + \Phi_e^2$$

with $\Phi_e \approx nI$
and $\Phi_s \approx$ part of the magnetic flux generated by the magnet $$F \approx \Phi_s^2 + 2nI\Phi_s + (nI)^2$$

The first term $$F \approx \Phi_e^2$$

is acting in the opposite direction of the force which attracts the plate to the upper pole piece and doesn't contribute additively in a positive manner to the operating force. The second term $F \approx 2\, nI\, \Phi_s$ generates force linearly proportional to the current and the static field in the air gap and depends on the current direction as shown in FIG. 5.

The third term $F \approx (nI)^2$ contributes a quadratic part to the force independent of the current direction. In practice, this linearity deviation is masked by the nozzle flapper characteristic.

Figure 6:
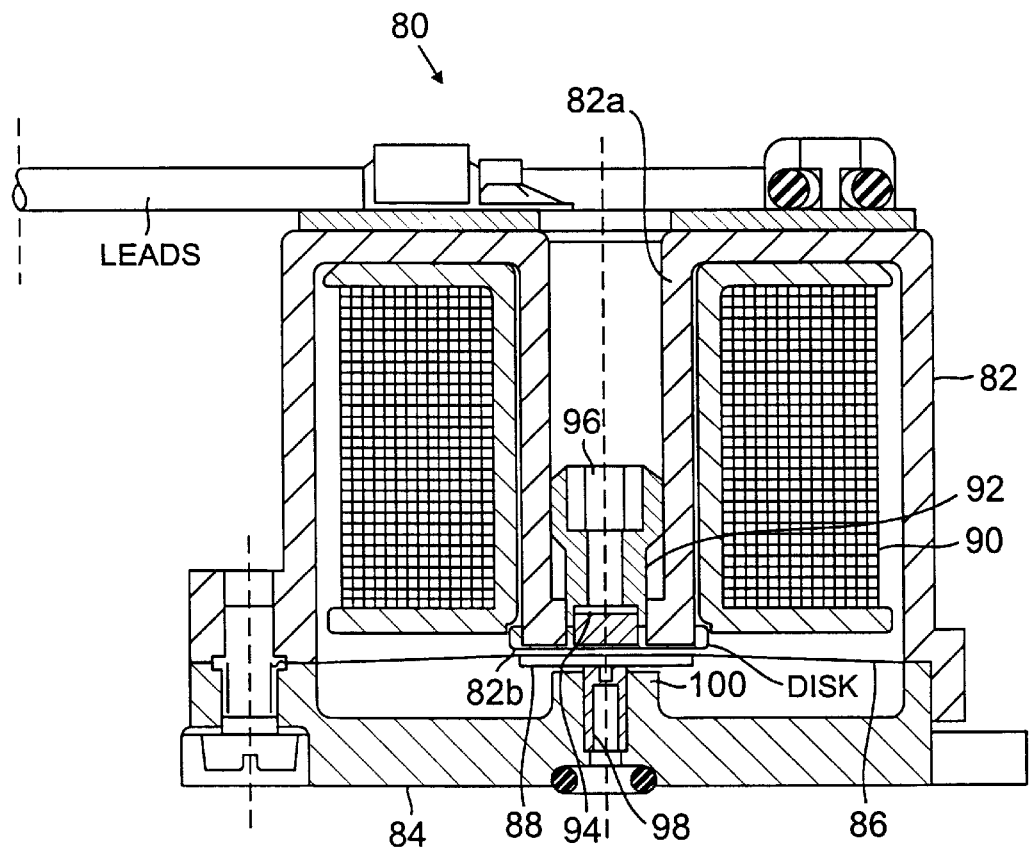
FIG. 6 is a longitudinal sectional view of another embodiment of an I/P motor with a movable permanent magnet in the face of the pole piece according to the invention.

A prototype I/P motor 80 implementing the design principles of the embodiment of FIG. 4 is shown in FIG. 6. Upper and lower cylindrical housing portions 82 and 84 matingly clamp a flat spring 86 carrying a disc shaped armature 88 between opposing pole faces of different dimensions. An integral hollow central post 82*a* extends from the top of the upper housing 82 and carries coil assembly 90. The lower end of the post 82*a* forms the outer portion 82*b* of the pole face. An adjustable pole member 92 is pressed in or threadably received inside the post 82*a*. By pressing or turning the pole member 92, it can be advanced within the post 82*a*. A rare earth permanent magnet 94 is disposed in the end face of the pole member 92. Thus the axial position of the magnet 94 can be independently determined. As in the embodiment of FIG. 4, nonmagnetic nozzle insert 98 is coaxially disposed in the upper end of the lower pole piece 100.

In the I/P motor of FIG. 4, as would also be the case with that of FIG. 6, the proportion of the field strength of the permanent magnet acting on the air gap between the upper and lower pole faces versus that between the magnet and upper pole piece can be modified by adjusting the axial position of the magnet 94. The flat spring 86 is prestressed so that the nozzle is closed without the force of the permanent magnet, as shown in FIG. 6. The upper face of the nozzle and the border of the lower housing part are on the same level. The thickness of the soft iron plate defines in combination with the spring strength the value of the prestressing. With the assembly as proposed it is easy to adjust the operating point of the flapper nozzle system by pulling away the armature from the nozzle by advancing the magnet 94. The point at which the armature 66 pulls away can be precisely detected pneumatically so that the operating point can be calibrated. This feature considerably reduces the tolerances required without the permanent magnet.

The I/P motor of FIG. 6 has several other improvements. The upper and lower housing and their integral pole pieces are preferably made of chrome-nickel alloy. Chrome-nickel has substantially better magnetic properties than the steel of prior devices. Further the housing is similar to stainless steel and has very good anticorrosive properties. The chrome-nickel housing is made through metal injection molding in which metallic particles are suspended in a polymer and fired. This results in the metal fusing and polymer being displaced.

To match the extremely low high temperature coefficient of thermal expansion of the chrome-nickel body, the spring is manufactured from Hastelloy B.

Other variations are within the claims.

What is claimed is:

1. A current to pressure converter for converting an input current signal to an output pressure signal, comprising:
    a magnetic circuit;
    two pole pieces having opposing pole faces of different dimensions defining therebetween an air gap in said magnetic circuit;
    a magnetically responsive armature resiliently suspended in the air gap;
    a pressurized fluid line having an inlet and an outlet;
    one of said pole pieces having a nozzle extending through the pole face of said pole piece in direct fluid communication with said pressurized fluid line between the inlet and outlet thereof so as to vent fluid in the fluid line through the nozzle, said nozzle being arranged relative to said armature so that fluid exiting the nozzle impinges on said armature;
    the other one of said pole pieces including an axially adjustable magnetic member in the vicinity of the pole face;
    an electrical coil assembly surrounding one of said pole pieces for energizing the magnetic circuit so as to force the armature to move closer to or farther away from the nozzle in order to block the fluid exiting the nozzle with the armature itself more or less, resulting in a concomitant increase or decrease in the pressure of the fluid at the outlet of said fluid line as a direct function of the level of electrical current flowing in said coil assembly.

2. The converter of claim 1, wherein said axially adjustable magnetic member is a permanent magnet.

3. The converter of claim 2, wherein said permanent magnet is mounted in the face of the other one of the pole pieces.

4. The converter of claim 3, wherein the coil assembly surrounds the pole piece with the permanent magnet.

5. The converter of claim 4, wherein a magnet holder carrying the magnet is adjustably received within the pole piece said.

6. The electropneumatic motor converter of claim 3 further comprising:
    a resilient suspension for said armature permanently prestressed sufficiently to force said armature as close as possible to said nozzle substantially in the absence of electrical current to said coil assembly.

7. The converter of claim 1, wherein
    said magnetic circuit is defined by a housing made of chrome-nickel alloy.

8. The converter of claim 7, further comprising a flat spring carrying said armature mounted in said housing, said spring being made of a material whose coefficient of thermal expansion matches that of said housing material.

9. The converter of claim 7, where in said spring in made of Hastelloy B.

10. The converter of claim 1, further comprising means for adjusting the effective axial position of the adjustable magnetic member to vary the spacing between the magnetic member and the armature in order to determine an operating point of the converter.

11. The converter of claim 10, wherein the adjustable magnetic member is a permanent magnet axially adjustably mounted in the face of the pole piece.

12. A method of calibrating an operating point of a current to pressure converter for converting an input current signal to an output pressure signal having a magnetic circuit energized by electrical current, a magnetically responsive armature resiliently suspended in the air gap between two pole faces of different dimensions in the circuit, a fluid nozzle in one of the pole faces directing pressurized fluid at the armature so as to vent a fluid supply line whose outlet pressure level is a direct function of the current level, comprising:

during manufacture adding a movable permanent magnet to the other pole face;

during manufacture permanently prestressing the suspension for the armature so that the armature is initially as close as possible to the nozzle thereby blocking the nozzle;

advancing the permanent magnet toward the armature substantially without electrical energizing current until the armature is pulled away from the nozzle in order to determine an operating point of the converter.

13. A current to pressure converter for converting an input current signal to an output pressure signal, comprising:

a housing assembly defining a magnetic circuit including two pole pieces having axially opposing pole faces of different effective dimensions defining therebetween an air gap in said magnetic circuit with a flux density gradient;

a resilient diaphragm assembly supported from its periphery by said housing assembly and suspended in said gap, said diaphragm assembly carrying a soft magnetic armature directly between the pole faces;

a pressurized fluid line having an inlet and an outlet;

the pole piece with the face of smaller effective dimensions having a nozzle extending through its pole face in the direction of the armature in direct fluid communication with said pressurized fluid line between the inlet and outlet thereof so as to vent fluid in the fluid line through the nozzle, said nozzle being arranged relative to said armature so that fluid exiting the nozzle impinges forcibly upon said armature;

a permanent magnet disposed in the face of the other one of said pole pieces with the larger effective dimensions; and an electrical coil assembly surrounding said other one of said pole pieces, the one with the permanent magnet, for energizing the magnetic circuit so as to force the armature to move closer to or farther away from the nozzle in order to block the fluid exiting the nozzle with the diaphragm assembly itself more or less, resulting in a concomitant increase or decrease in the pressure of the fluid at the outlet of said fluid line as a direct function of the level of electrical current flowing in said coil assembly, said permanent magnet more nearly linearizing the force on the armature with respect to current at low current levels approaching zero in comparison to the same system without the permanent magnet.

14. The converter of claim 13 wherein the presence of said permanent magnet causes the direction of force on the armature to be dependent on the polarity of the current.

15. The converter of claim 14 wherein the electrical current applied to said coil is direct current.

* * * * *